United States Patent
Yoshida et al.

(10) Patent No.: US 8,743,175 B2
(45) Date of Patent: Jun. 3, 2014

(54) 3D IMAGE FILE, PHOTOGRAPHING APPARATUS, IMAGE REPRODUCING APPARATUS, AND IMAGE PROCESSING APPARATUS

(75) Inventors: Hideaki Yoshida, Hachioji (JP); Ken Mashitani, Neyagawa (JP); Toshio Nomura, Funabashi (JP); Tadashi Uchiumi, Osaka (JP); Hidehiko Sekizawa, Tokyo (JP)

(73) Assignees: Olympus Imaging Corp., Tokyo (JP); Sanyo Electric Co., Ltd., Osaka (JP); Sharp Kabushiki Kaisha, Osaka (JP); Sony Corporation, Tokyo (JP)

( * ) Notice: Subject to any disclaimer, the term of this patent is extended or adjusted under 35 U.S.C. 154(b) by 1359 days.

(21) Appl. No.: 12/009,577

(22) Filed: Jan. 17, 2008

(65) Prior Publication Data

US 2008/0198219 A1   Aug. 21, 2008

Related U.S. Application Data

(63) Continuation of application No. PCT/JP2006/314275, filed on Jul. 19, 2006.

(30) Foreign Application Priority Data

Jul. 19, 2005 (JP) .................................. 2005-208706

(51) Int. Cl.
*H04N 13/00* (2006.01)
*H04N 15/00* (2006.01)

(52) U.S. Cl.
USPC .............................. 348/43; 345/419; 382/276

(58) Field of Classification Search
USPC .......... 382/181, 287, 111, 224, 272; 345/419, 345/422, 88; 348/36; 600/310, 410; 355/40
See application file for complete search history.

(56) References Cited

U.S. PATENT DOCUMENTS 5,856,829 A * 1/1999 Gray et al. ..................... 345/422
5,983,120 A * 11/1999 Groner et al. ................. 600/310

(Continued)

FOREIGN PATENT DOCUMENTS

EP    1 501 317    1/2005
JP    08-116555    5/1996

(Continued)

OTHER PUBLICATIONS

PCT/IB/373, "International Preliminary Report on Patentability" for PCT/JP2006/314275 (1 pg.).

(Continued)

*Primary Examiner* — Dustin Nguyen
(74) *Attorney, Agent, or Firm* — John C. Pokotylo; Straub & Pokotylo

(57) ABSTRACT

A photographing apparatus has two binocular stereoscopic modes. In two-take photography mode, a 3D image file is generated from left and right monocular images acquired by performing monocular photographing twice, and the 3D image file thus generated is recorded. In one-take photography mode, a 3D image file is generated from left and right monocular images acquired by performing binocular photographing once, and the 3D image file thus generated is recorded. When the 3D image file is recorded, a homogeneity tag is recorded in 3D metadata, as tag information of the header data portion of the 3D image file. The homogeneity tag is information about the homogeneity of the two monocular images and describes whether the two monocular images have been acquired in the one-take photography mode in which monocular images highly homogeneous are provided, or in the two-take photography mode in which monocular images not so homogeneous are provided.

15 Claims, 8 Drawing Sheets

(56) References Cited

U.S. PATENT DOCUMENTS

| | | | |
|---|---|---|---|
| 6,222,613 B1 * | 4/2001 | Haraguchi et al. | 355/40 |
| 6,621,915 B1 * | 9/2003 | Chen et al. | 382/111 |
| 6,700,559 B1 * | 3/2004 | Tanaka et al. | 345/88 |
| 6,718,063 B1 * | 4/2004 | Lennon et al. | 382/224 |
| 6,888,540 B2 * | 5/2005 | Allen | 345/419 |
| 7,395,108 B2 * | 7/2008 | Roopchansingh et al. | 600/410 |
| 7,421,125 B1 * | 9/2008 | Rees | 382/181 |
| 7,463,280 B2 * | 12/2008 | Steuart, III | 348/36 |
| 7,463,787 B2 * | 12/2008 | Atsumi et al. | 382/272 |
| 7,613,361 B2 * | 11/2009 | Anabuki et al. | 382/287 |
| 2002/0071616 A1 | 6/2002 | Yoshida | |
| 2003/0007680 A1 | 1/2003 | Iijima et al. | |

FOREIGN PATENT DOCUMENTS

| | | |
|---|---|---|
| JP | 8-317425 | 11/1996 |
| JP | 2002-77943 | 3/2002 |
| JP | 2002-077947 | 3/2002 |
| JP | 2005-112819 | 6/2005 |
| JP | 2005-142819 | 6/2005 |
| JP | 2005-533433 | 6/2005 |
| WO | WO 2004/008768 | 1/2004 |

OTHER PUBLICATIONS

English translation of PCT/ISA/237, "Written Opinion of the International Searching Authority" for PCT/JP2006/314275 (4 pgs.).

PCT/ISA/210, "International Search Report" for PCT/JP2006/314275, mailed Oct. 31, 2006 (2 pgs.).

Notice of Reasons for Rejection for Japanese Patent Application No. 2005-208706, mailed Aug. 17, 2010 (2 pgs.) with translation (2 pgs.).

Supplementary European Search Report for European Patent Application No. 06768301.1-1241, mailed Jun. 15, 2012 (8 pgs.).

* cited by examiner

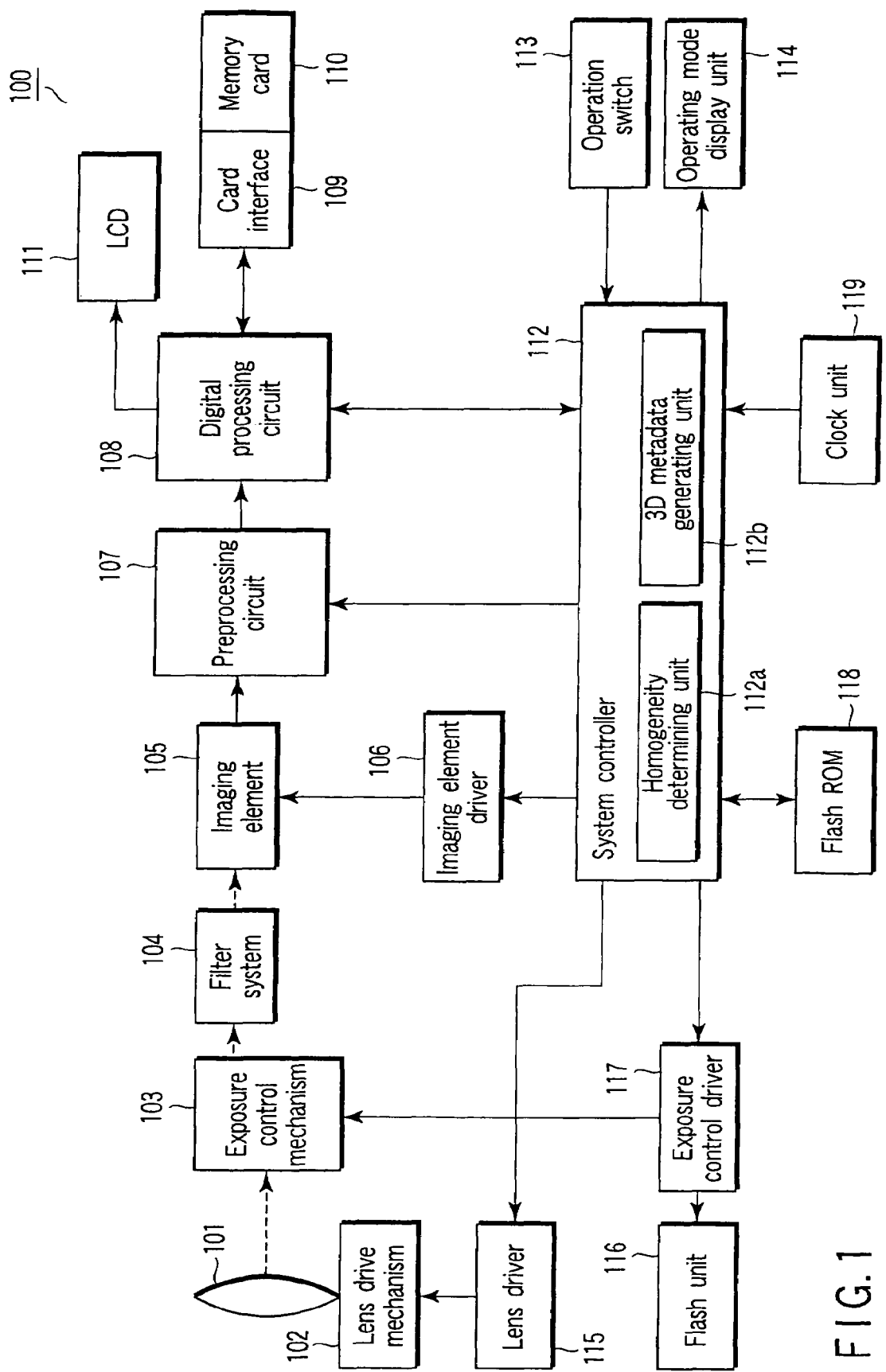
F I G. 1

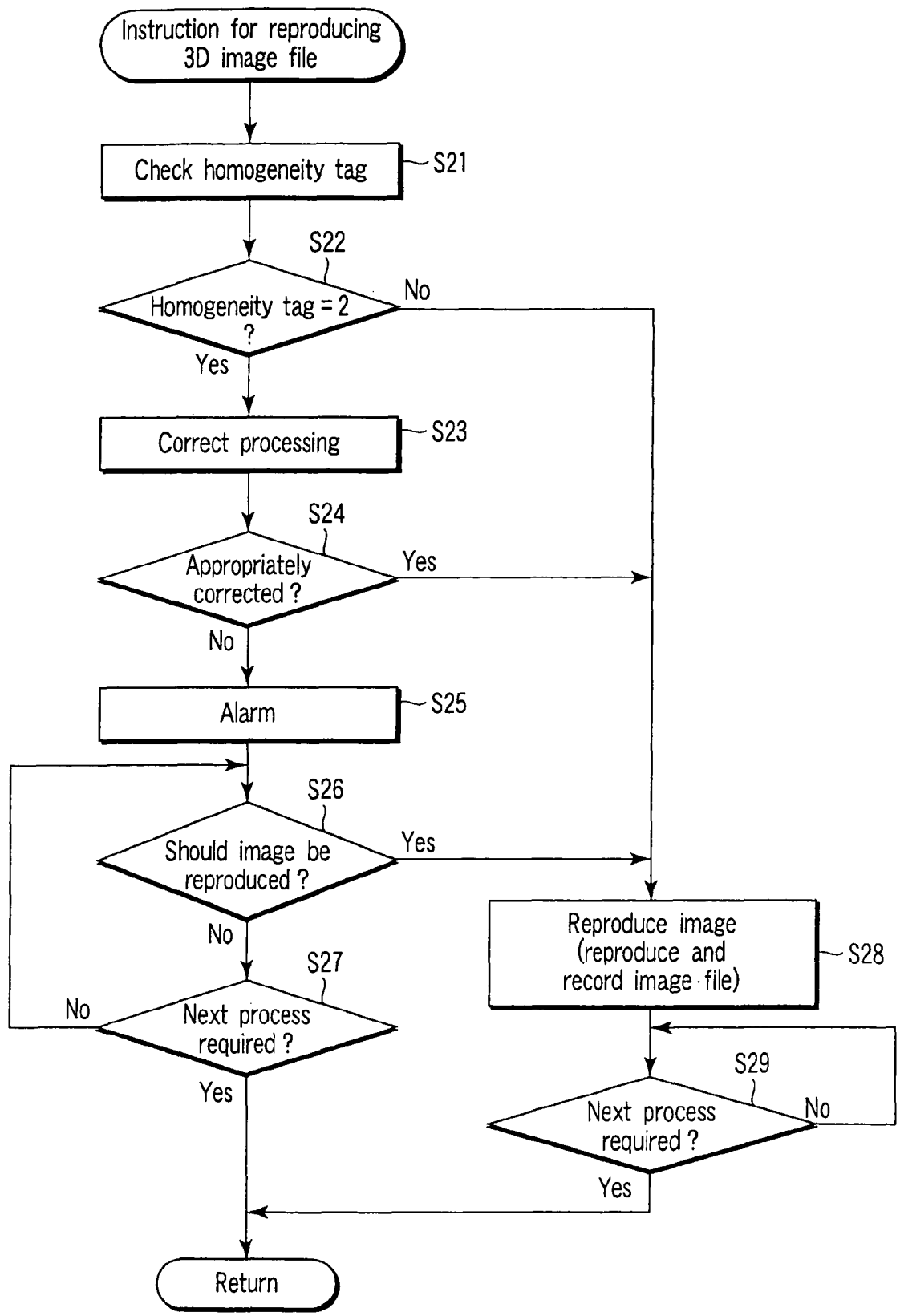
F I G. 10

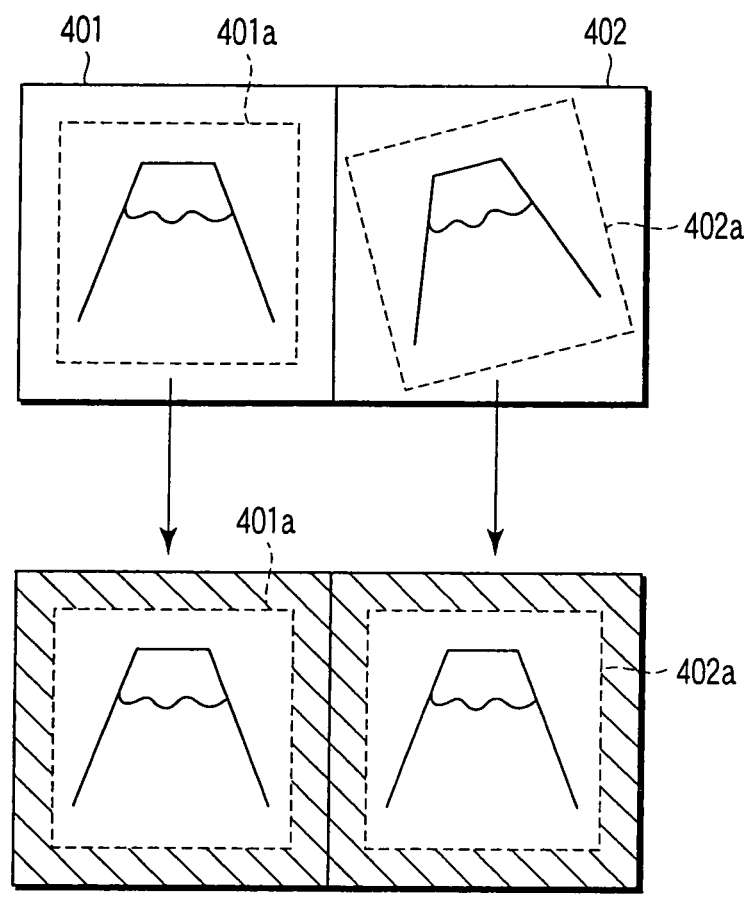
F I G. 11

US 8,743,175 B2

3D IMAGE FILE, PHOTOGRAPHING APPARATUS, IMAGE REPRODUCING APPARATUS, AND IMAGE PROCESSING APPARATUS

CROSS REFERENCE TO RELATED APPLICATIONS

This is a Continuation Application of PCT Application No. PCT/JP2006/314275, filed Jul. 19, 2006, which was published under PCT Article 21(2) in Japanese.

This application is based upon and claims the benefit of priority from prior Japanese Patent Application No. 2005-208706, filed Jul. 19, 2005, the entire contents of which are incorporated herein by reference.

BACKGROUND OF THE INVENTION

1. Field of the Invention

The present invention relates to a 3D image file that records stereoscopic image data, a photographing apparatus that generates and records such a 3D image file, an image reproducing apparatus for reproducing such a 3D image file, and an image processing apparatus that generates a 3D image file.

2. Description of the Related Art

Various methods are available, which photograph and record the data items representing images of objects, each data item containing stereoscopic information about the image.

Of these methods, so-called binocular stereoscopic photographing, which records two images that has a parallax with respect to the viewpoints of the left and right eyes, has hitherto been utilized because it is highly effective through relatively simple in configuration and relatively low in cost.

With regard to terminology, the terms "3D," "three-dimensional" and "stereoscopic" are used in the same meaning in the present specification, unless otherwise defined. Both terms are used to mean the stereoscopic technology accomplishing stereoscopy that reproduces visually real three-dimensional information. In some cases, the terms may be used in different senses in context or by custom. Nonetheless, they are not different in essential meaning.

To accomplish binocular stereoscopic photographing, a method may be employed, in which a binocular camera that comprises two optical systems having a parallax between the viewpoints of the left and right eyes is used, as is disclosed in Jpn. Pat. Appln. KOKAI Publication No. 8-317425. Binocular stereoscopic photographing may be performed by using two monocular cameras. In this case, the monocular cameras are spaced apart by a distance corresponding to the parallax between the viewpoints of the left and right eyes. Alternatively, one monocular camera may be used to achieve binocular stereoscopic photographing. In this case, the object is photographed twice, by setting the camera first at a position and then at another position. Another method of performing binocular stereoscopic photographing is available, in which a device known as stereoscopic adapter comprising mirrors and prisms is attached to a camera body, as disclosed in Jpn. Pat. Appln. KOKAI Publication No. 2002-77943.

BRIEF SUMMARY OF THE INVENTION

According to a first aspect of the invention, there is provided a data structure of a 3D image file recording stereoscopic image data composed of a plurality of monocular images that are constituent elements of one multi-ocular stereoscopic image, wherein the 3D image file is constituted as a smallest unit of image treatment by being added 3D metadata including at least information about homogeneity of the plurality of monocular images to entire or part stereoscopic image data.

According to a second aspect of the invention, there is provided a photographing apparatus recording comprising: a recording unit which records a 3D image file recording stereoscopic image data composed of a plurality of monocular images that are constituent elements of one multi-ocular stereoscopic image; at least one imaging unit which acquires a plurality of monocular images which are constituent elements of one multi-ocular stereoscopic image; a homogeneity determining unit which determines the homogeneity of the plurality of monocular images acquired by the imaging unit; and a 3D metadata generating unit which generates the 3D metadata by setting the information about the homogeneity of the plurality of monocular images, on the basis of a decision made by the homogeneity determining unit.

According to a third aspect of the invention, there is provided an image reproducing apparatus for reproducing a 3D image file recording stereoscopic image data composed of a plurality of monocular images that are constituent elements of one multi-ocular stereoscopic image, the apparatus comprising: an alarm unit which generates an alarm when the information about the homogeneity of the plurality of monocular images contained in the 3D metadata of the 3D image file indicates low homogeneity.

According to a fourth aspect of the invention, there is provided an image reproducing apparatus for reproducing a 3D image file recording stereoscopic image data composed of a plurality of monocular images that are constituent elements of one multi-ocular stereoscopic image, the apparatus comprising: an interruption unit which interrupts the reproduction of the 3D image file when the when the information about the homogeneity of the plurality of monocular images contained in the 3D metadata of the 3D image file indicates low homogeneity.

According to a fifth aspect of the invention, there is provided an image reproducing apparatus for reproducing a 3D image file recording stereoscopic image data composed of a plurality of monocular images that are constituent elements of one multi-ocular stereoscopic image, the apparatus comprising: a correction unit which performs a correction process, thereby increasing the homogeneity of the plurality of monocular images when the information about the homogeneity of the plurality of monocular images contained in the 3D metadata of the 3D image file indicates low homogeneity.

According to a sixth aspect of the invention, there is provided an image reproducing apparatus for reproducing a 3D image file recording stereoscopic image data composed of a plurality of monocular images that are constituent elements of one multi-ocular stereoscopic image, the apparatus comprising: a processing unit which switches the plurality of monocular images when the information about the homogeneity of the plurality of monocular images contained in the 3D metadata of the 3D image file indicates low homogeneity.

According to a seventh aspect of the invention, there is provided an image processing apparatus for processing a 3D image file recording stereoscopic image data composed of a plurality of monocular images that are constituent elements of one multi-ocular stereoscopic image, the apparatus comprising: a correction unit which performs a correction process, thereby increasing the homogeneity of the plurality of monocular images when the information about the homogeneity of the plurality of monocular images contained in the 3D metadata of the 3D image file indicates low homogeneity; and a recording unit which records, as a 3D image file, a corrected output of the correction unit.

According to an eighth aspect of the invention, there is provided an image processing apparatus for processing a 3D image file recording stereoscopic image data composed of a plurality of monocular images that are constituent elements of one multi-ocular stereoscopic image, the apparatus comprising: a processing unit which switches the plurality of monocular images when the information about the homogeneity of the plurality of monocular images contained in the 3D metadata of the 3D image file indicates low homogeneity; and a recording unit which records an output of the processing unit as a 3D image file.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the internal structure of a digital camera 100, i.e., an example of a photographing apparatus according to an embodiment of the present invention;

FIG. 10 is a flowchart explaining a process performed while images are being reproduced in the image reproducing apparatus; and FIG. 11 is a diagram illustrating an example of an image correcting process.

DETAILED DESCRIPTION OF THE INVENTION

Figure 2A:
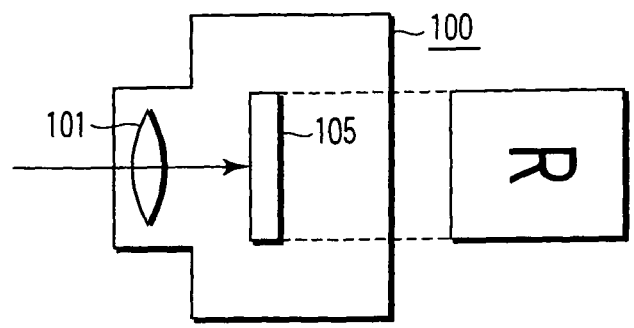
FIG. 2A is a diagram illustrating the case where a monocular image for the right viewpoint is acquired in the two-take photography mode.

An embodiment of the present invention will be described with reference to the accompanying drawings.

FIG. 1 is a block diagram showing the internal structure of a digital camera 100 that is an example of a photographing apparatus according to an embodiment of this invention. The digital camera 100 shown in FIG. 1 is, for example, a monocular digital camera. This camera 100 can generate a 3D image file in a prescribed format, from a plurality of images (monocular images) which have been obtained by photographing an object from a plurality of viewpoints and which are elements that constitute a multi-ocular stereoscopic image. As shown in FIG. 1, the digital camera 100 comprises a photographing lens system 101, a lens drive mechanism 102, an exposure control mechanism 103, a filter system 104, an imaging element 105, an imaging element driver 106, a preprocessing circuit 107, a digital processing circuit 108, a card interface 109, and a memory card 110. The camera 100 further comprises an LCD 111, a system controller 112, an operation switch unit 113, an operating-mode display unit 114, a lens driver 115, a flash unit 116, an exposure control driver 117, a flash ROM 118, and a clock unit 119.

The photographing lens system 101 is a lens system composed of various lenses. It focuses, on the imaging element 105, the image (hereinafter, called object image) of an object (not shown) through the exposure control mechanism 103 and filter system 104. The photographing lens system 101 is driven by the lens drive mechanism 102. The lens drive mechanism 102, which comprises a motor and the like, drives the lenses constituting the photographing lens system 101 in their respective optical axes. The lens drive mechanism 102 is controlled by the lens driver 115. The exposure control mechanism 103 is a mechanism that controls the exposure, i.e., the amount of light applied to the imaging element 105. The exposure control mechanism 103 is composed of an aperture, a shutter, and a drive mechanism for driving the aperture and the shutter. The exposure control driver 117 controls the exposure control mechanism 103. The filter system 104 is composed of an optical low-pass filter and the like. It filters out the specific frequency component, e.g., high-frequency component, from the object image coming through the photographing lens system 101 and exposure control mechanism 103.

The imaging element 105, which is a photographing unit, performs photoelectric conversion, converting the object image into an image signal. The imaging element 105 is, for example, a noninterlace type CCD of the interline transfer type, which has the vertical overflow drain structure. The imaging element 105 is driven by the imaging element driver 106. The imaging element driver 106 controls the driving of the imaging element 105 and the reading of the image signal generated by the imaging element 105.

The preprocessing circuit 107 is a preprocessing circuit that includes a gain-controlled amplifier, an analog-to-digital converter, and the like. The preprocessing circuit 107 performs various preprocesses. More precisely, the gain-controlled amplifier amplifies the image signal input from the imaging element 105, with a predetermined gain, and the analog-to-digital converter converts the image signal to digital data. The digital processing circuit 108 performs various digital image processes such as white-balance adjustment, gradation conversion and sharpness adjustment. The digital processing circuit 108 also compresses the digital image data, using a data compression scheme such as the JPEG scheme. The image data thus compressed is recorded via the card interface 109 in the memory card 110. The LCD 111 is composed of, for example, an LCD and a control circuit for controlling the LCD. The LCD 111 displays an image based on the image data obtained through the digital image processes performed in the digital processing circuit 108.

The system controller 112 performs all controls in the camera 100. More specifically, the controller 112 automatically controls the aperture and shutter of the exposure control mechanism 103, controls the imaging element driver 106, designates a gain to the gain controller of the preprocessing circuit 107 and designates quantization bits for use in the analog-to-digital converter. Further, the controller 112 calculates the white-balance gain for the white-balance adjustment in the digital processing circuit 108, designates the data compression scheme and data compression ratio, and controls the lens driver 115 and exposure control driver 117. The system controller 112 has a homogeneity determining unit 112a as a homogeneity determining unit and a 3D metadata generating unit 112b as a 3D metadata generating unit. The homogeneity determining unit 112a determines the homogeneity of monocular images acquired in the stereoscopic photography mode. The 3D metadata generating unit 112b generates 3D metadata from the information about the homogeneity that the homogeneity determining unit 112a has determined. Further, the system controller 112 functions as a recording unit for generating 3D image files from the 3D metadata generated by the 3D metadata generating unit 112b and recording the 3D image files in the memory card 110.

The operation switch unit 113 comprises various switches that are turned on or off as the various operation buttons provided on the digital camera are operated. More precisely, the operation switch unit 113 includes a release switch and a mode switch or the like. When turned on, the release switch starts releasing the shutter of the digital camera. When turned on, the mode switch changes the photography mode of the digital camera to the stereoscopic photography mode. The operating-mode display unit 114 displays the operated state of the operation switch unit 113.

The flash unit 116 is a light-emitting unit that is used to apply auxiliary illumination light during the photographing. The flash unit 116 is controlled by the exposure control driver 117. The flash ROM 118 is a nonvolatile memory that stores the programs for controlling the digital camera and the information representing various set conditions. The clock unit 119 is provided to record a photographing time when any object is photographed. Note that the clock unit 119 may be incorporated in the system controller 112.

How the digital camera shown in FIG. 1 operates to perform stereoscopic photographing will be explained. The digital camera can perform stereoscopic photographing after the mode switch included in the operation switch unit 113 has been operated, thereby setting the camera to the stereoscopic photography mode.

Assume that the camera performs binocular stereoscopic photographing to acquire two monocular images for the left and right viewpoints, while it remains in the binocular stereoscopic photography mode. The digital camera 100 shown in FIG. 1 can be operated in two binocular-stereoscopic photography modes, i.e., two-take photography mode and one-take photography mode. In the two-take photography mode, the camera 100 photographs an object twice, first for the left view point and then for the right viewpoint, thereby provides two monocular images, generates a 3D image file from the monocular images, and records the 3D image file thus generated. In the one-take photography mode, the camera 100 photographs an object once, provides two monocular images for the left and right view points, generates a 3D image file from the monocular images, and records the 3D image file thus generated. The two stereoscopic photography modes are switched, from one to the other, when the mode switch is operated.

Figure 2B:
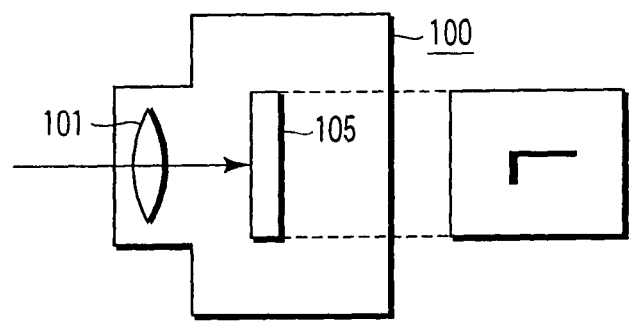
FIG. 2B is a diagram illustrating the case where a monocular image for the left viewpoint is acquired in the two-take photography mode.

FIGS. 2A and 2B are diagrams that illustrate how two monocular images are acquired for the right viewpoint and the left viewpoint, respectively, in the two-take photography mode. In the two-take photography mode, the user first photographs the object at the position corresponding to the left viewpoint as shown in FIG. 2B, and then photographs the object at the position corresponding to the right viewpoint as shown in FIG. 2A, in accordance with the prescribed rule about the photographing procedure. During the first photographing and the second photographing, the system controller 112 performs controls so that the photographing conditions, such as aperture value and shutter speed, are the same in the first photographing and the second photographing. Thus, a monocular image L is acquired for the left viewpoint at the first photographing, and a monocular image R is acquired for the right viewpoint at the second photographing. From the monocular images L and R, stereoscopic image data is generated. From the stereoscopic image data, a 3D image file is generated as will be described later.

In the two-take photography mode, the photographing may be performed twice when the user operates the release switch twice or when the user operates the release switch only once.

Figure 3:
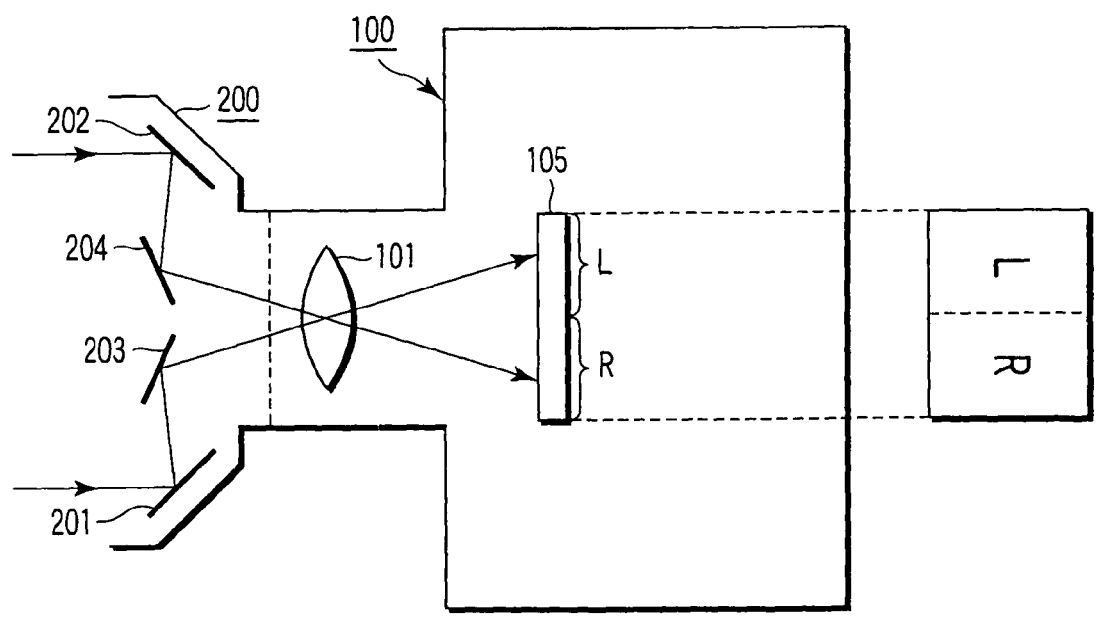
FIG. 3 is a diagram illustrating the case where monocular images for the left and right viewpoints, respectively, are acquired in the one-take photography mode.

FIG. 3 is a diagram illustrating the case where monocular images for the left and right viewpoints, respectively, are acquired in the one-take photography mode. In the one-take photography mode, the user may photograph an object, with a stereoscopic adapter attached to the digital camera 100. The stereoscopic adapter 200 comprises a plurality of mirrors 201 to 204 and focuses light fluxes coming from an object and coming different viewpoints, on different regions of the imaging element 105. That is, the light flux (lower region, in FIG. 3) coming from the left viewpoint to the stereoscopic adapter 200 is reflected by the mirrors 201 and 203 and focused on the right region (upper region, in FIG. 3) of the imaging element 105. On the other hand, the light flux (upper region, in FIG. 3) coming from the right viewpoint to the stereoscopic adapter 200 is reflected by the mirrors 202 and 204 reflect and focused on the left region (lower region, in FIG. 3) of the imaging element 105. At this time, the left and right images look as if arranged other way around. Nonetheless, the left and right images are arranged on the imaging element 105 on the left and right sides, respectively, or arranged parallel, since the photographing lens system 101 form inverted images. Monocular image L and monocular image R are thereby acquired. From these monocular images L and R, stereoscopic image data is generated as will be described later. From the stereoscopic image data, a 3D image file will be generated.

Unless the stereoscopic adapter 200 is attached to the digital camera 100, two monocular images for the left and right viewpoints, respectively, can be obtained at one photographing if two digital cameras are arranged at the positions corresponding to the left and right viewpoints and connected by a cable so that their shutters may be released at the same time. Although not shown in FIG. 1, a binocular digital camera having two lens systems and two imaging elements may be used to accomplish the photographing.

The process performed to generate a 3D image file in this embodiment will be described. To achieve successful stereoscopic photographing it is important to maintain the homogeneity of the left and right monocular images. However, it is almost impossible to keep the monocular images perfectly homogeneous. Nonetheless, for managing the homogeneity, it is desirable to record information about the homogeneity in the 3D image file generated at the time of photographing. This is because the homogeneity of the left and right monocular images is determined at the time of photographing the object.

Therefore, when a 3D image file is generated in the digital camera 100 according to the present embodiment, the information about the homogeneity of the two monocular images (hereinafter called homogeneity tag) is recorded in the 3D image file. The homogeneity tag contains a data item showing in which mode the two monocular images have been acquired, the one-take photography mode or two-take photography mode. This is because the two monocular images acquired in the one-take photography mode have high homogeneity, while the two monocular images acquired in the two-take photography mode have low homogeneity. If the two monocular images have been acquired in the one-take photography mode, the homogeneity tag is set to "1," showing that the monocular images have been obtained in the one-take photography mode. If the two monocular images have been acquired in the two-take photography mode, the homogeneity tag is set to "2," showing that the monocular images have been obtained in the two-take photography mode.

Figure 4:
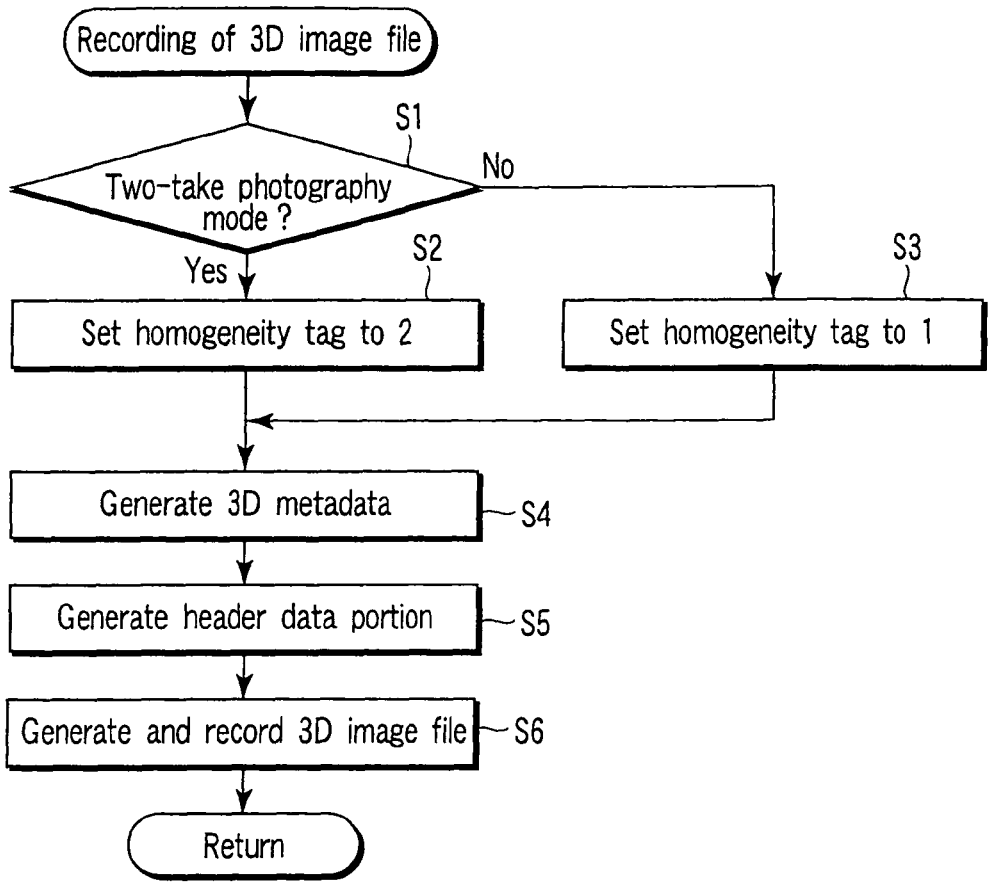
FIG. 4 is a flowchart explaining a process of recording a 3D image file.

The process of recording a 3D image file will be explained, with reference to the flowchart of FIG. 4. The process shown in the flowchart of FIG. 4 is performed by the system controller 112 in the stereoscopic photography mode.

When stereoscopic photographing is performed in the one-take photography mode or the two-take photography mode, two monocular images L and R for the left and right viewpoints are generated from the object image focused on the imaging element 105. Thereafter, the process shown in the flowchart of FIG. 4 is started. In the system controller 112, the homogeneity determining unit 112*a* determines whether the two monocular images have been acquired in the two-take photography mode (Step S1).

It should be noted that the decision made in Step S1 comes in two versions. The first version is concerned with, literally, "whether the two monocular images have been acquired in the two-take photographing." In other words, this version is: whether the two monocular images for the left and right viewpoints have been obtained by performing two exposures at different times. The second version is concerned with "whether the images to be handed as acquired through two-take photographing may possibly be degraded in terms of homogeneity."

The present embodiment adopts the first version of that decision. The homogeneous tag is set based on this decision only, because generally, the homogeneity is easily maintained in the one-take photographing and is hardly maintained in the two-take photographing. This case is advantageous since the decision criterion is very clear and raises no problem in making a decision of the first version.

A modified embodiment that adopts the second version of the decision will be described. Even two monocular images acquired in the two-take photographing may maintain homogeneity in some cases. In addition, even two monocular images acquired in the one-take photographing may not maintain homogeneity in some cases. Hence, in the modified embodiment, in Step S1 it is determined whether the two monocular images are homogeneous. If the two monocular images are homogeneous, they are regarded as have been obtained in the one-take photography mode even if they have been acquired in the two-take photography mode. If the two monocular images are not homogeneous, they are regarded as have been obtained in the two-take photography mode even if they have been acquired in the one-take photography mode. Either decision is made in accordance with whether the monocular images have been acquired at the same time, whether they acquired by different digital cameras and whether they have been acquired in the same photographing condition. The decision thus made means that the two monocular images are considered to be homogeneous or to have been acquired in the one-take photography mode, so long as the homogeneity falls within a certain tolerance range. The tolerance range may be set as needed, in accordance with, for example, the specification of the digital camera 100.

The timing of acquiring one monocular image may greatly differ from the timing of acquiring the other monocular image. In this case, a camera shake may be caused while the photographing is being performed twice. (The camera shake includes a rotation of the object image. Further, the camera shake includes of moving of the object while the photographing is being performed twice.) Hence, the two monocular images are considered not to be homogeneous. Two monocular images acquired by different cameras (not by the same camera) are regarded not to be homogenous, too. This is because the cameras may differ in the characteristic of the lens system (e.g., spectroscopic transmissivity and angle of view), the characteristic of the imaging element (e.g., the number of effective pixels and the saturation level) and the characteristic of the analog-to-digital converter (e.g., the number of quantization bits, obtained when data is converted to digital data). The more greatly the cameras differ in type, the larger the difference in the characteristics of their components. Even if the cameras are of the same type, they may differ in characteristics on individual basis or differ in setting items. This is why the homogeneity of the monocular images is evaluated in accordance with whether the cameras are identical in characteristics. It should be noted that if different cameras are used, providing two monocular images, the images may not be homogeneous unless the cameras are secured to their respective platforms at an appropriate angle, even if the cameras simultaneously perform exposure by means of synchronous shutter releasing.

Further, the camera is regarded to remain in the two-take photography mode if the two monocular images greatly differ in terms of photographing condition. They are so regarded, if the left monocular image L, for example, is compressed in the RAW mode, while the right monocular image R is compressed in the JPEG mode. They are so regarded, too, if monocular images L and R have been acquired, one by using the flash unit, while the other by not using the flash unit. This may take place when the photographing is carried out twice, first acquiring the left monocular image L by using the flash unit, and then acquiring the right monocular image R without using the flash unit, which has not been charged enough. Further, the two monocular images are regarded as not homogeneous if they greatly differ in exposure conditions at the photographing such as aperture value, shutter speed and photographing sensitivity (e.g., gain applied to the gain-controlled amplifier), in image processing conditions such as white-balance between the monocular images L and R, color-signal processing method and gradation characteristic, or in image recording conditions such as the resolution, the compression ratio and the numbers of pixels.

With reference to the flowchart of FIG. 4, again, the process goes from Step S1 to Step S2 in both the two versions described above, if it is determined in Step S1 that the two monocular images have been acquired in the two-take photography mode. In Step S2, the homogeneity tag is set to "2," showing that the two monocular images have been obtained in the two-take photography mode, if the two monocular images are considered acquired in the two-take photography mode (Step S2). On the other hand, if the two monocular images are considered to have been acquired in the one-take photography mode, the process goes from Step S1 to Step S3. In Step S3, the homogeneity tag is set to "1," showing that the two monocular images have been obtained in the one-take photography mode (Step S3).

The content of the homogeneity tag may be manually set as the user operates the operation switch unit 113.

After the homogeneity tag is set in Step S2 or Step S3 or is manually set, the 3D metadata generating unit 112b generates 3D metadata that contains the homogeneity tag (Step S4). This 3D metadata is information that will be recorded as one tag-data item of Exif, i.e., general-purpose image file format fit for digital cameras. The 3D metadata contains, in addition to the information (homogeneity tag) about the homogeneity of the two monocular images, the information indicating that the 3D image file has been obtained by stereoscopic photographing, the information about the positions of viewpoints concerning the monocular images, and parameters related to the recording and reproducing of the stereoscopic image data recorded in the 3D image file. Note that 3D metadata file can be recorded, not only as the tag information of Exif, but also in a given format. It may be recorded as text metadata that is described by using XML, such as XMP (trademark) proposed by Adobe, Inc.

After the 3D metadata is generated in Step S4, various data items, such as the exposure conditions at the stereoscopic photographing (i.e., aperture value and shutter speed) and the data compression scheme used at recording are added, as tag information, to the 3D metadata, whereby a header data portion is generated (Step S5). Thereafter, the header data portion is added to the stereoscopic image data, whereby a 3D image file is generated. The 3D image file is recorded in the memory card 110 (Step S6). Thus, the process of FIG. 4 is terminated.

Figure 5:
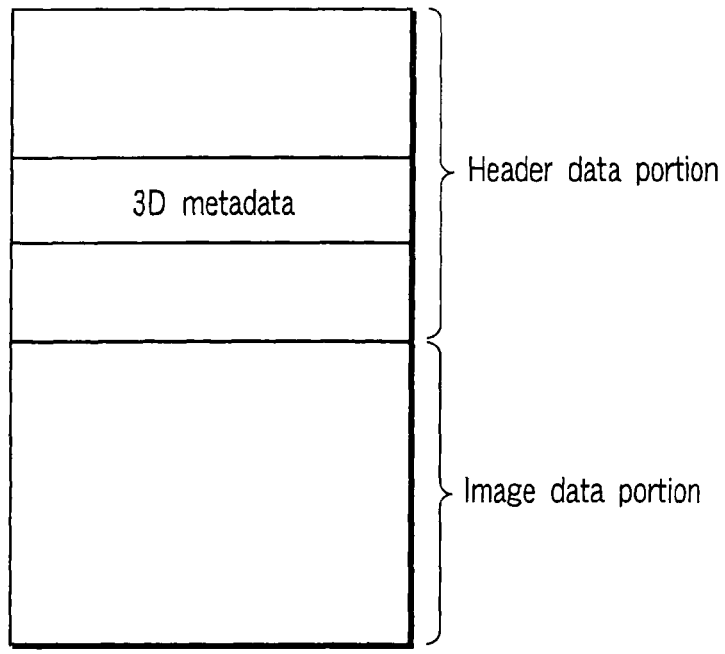
FIG. 5 is a diagram representing the conceptual configuration of a 3D image file.

FIG. 5 is a diagram representing the conceptual configuration of the 3D image file generated in the process shown in FIG. 4. This 3D image file is treated as a smallest unit of image, which is composed by adding the stereoscopic image data generated from two monocular images, to the image data portion compressed by, for example, the JPEG scheme and then recorded.

Figure 6A:
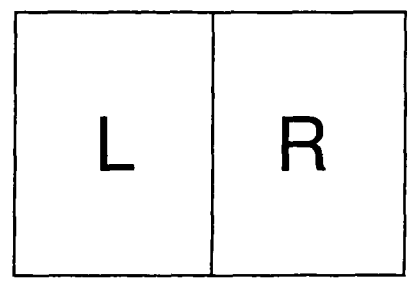
FIG. 6A is a diagram showing a stereoscopic image of consolidated stereoscopic image data type, which has been generated from monocular images.

The stereoscopic image data will be described. The stereoscopic image data is composed of two monocular images. This data is recorded in a 3D image file, as consolidated data that is composed by arranging two monocular images L and R in different regions of one planer image as illustrated in FIG. 6A. In the one-take photography mode using the stereoscopic adapter 200, the digital processing circuit 108 processes the image data generated by the imaging element 105, and the image data thus processed is recorded. In the two-take photography mode, the monocular image L acquired at the first photographing is stored in the buffer memory (not shown) incorporated in the digital camera 100. In the two-take photography mode, too, when the monocular image R is acquired at the second photographing, the monocular images L and R are re-sized and synthesized in the left and right halves of one image and the resulting synthesized image is processed and recorded.

Figure 6B:
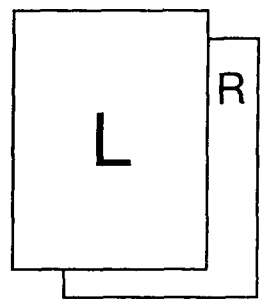
FIG. 6B is a diagram showing a stereoscopic image of multi-page stereoscopic image data type, which has been generated from monocular images.
Figure 6C:
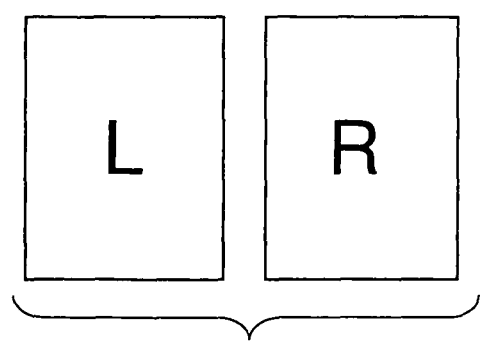
FIG. 6C is a diagram showing the case where two monocular images are recorded on 3D image files, respectively.

The data format of the stereoscopic image is not limited to the consolidated stereoscopic image data shown in FIG. 6A. Instead, it may be multi-page stereoscopic image data which represents the monocular images L and R as page images as illustrated in FIG. 6B. Alternatively, it may consists of two monocular images L and R recorded in two 3D image files, respectively, as is illustrated in FIG. 6C. In this case, however, the information indicating that the two monocular images L and R are related to each other (they are elements constituting one stereoscopic image) must be described in at least one of the 3D metadata items representing the 3D image files L and R.

Figure 9:
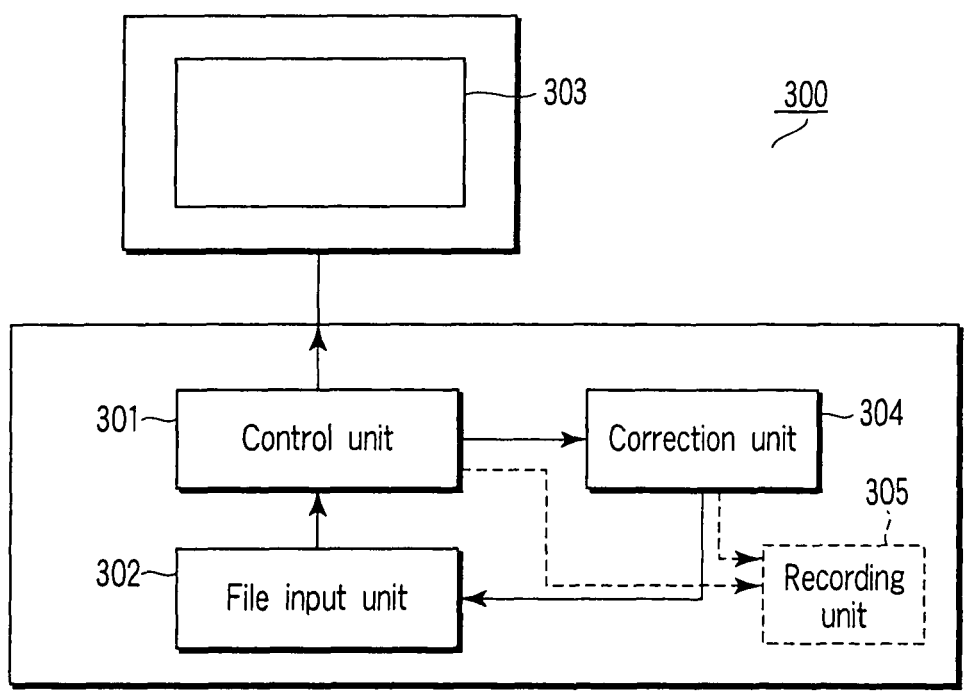
FIG. 9 is a diagram showing the configuration of an image reproducing apparatus.

An image reproducing apparatus that reproduces the 3D image file recorded in the memory card 110 in the process of FIG. 4. As will be described later, this apparatus functions not only as an apparatus for reproducing 3D images, but also as an image processing apparatus that generates an 3D image file again and records the 3D image file generated, if necessary. FIG. 9 is a diagram showing the configuration of this image reproducing apparatus. The image reproducing apparatus 300 shown in FIG. 9 comprises a control unit 301, a file input unit 302, an image reproducing unit 303, and a correction unit 304. If this apparatus functions as an image processing apparatus, it will further comprise a recording unit 305.

The control unit 301 controls the other components of the image reproducing apparatus 300. The control unit 301 can function as an alarm unit and a record/playback stopping unit. The file input unit 302 is an interface unit that inputs the 3D image file recorded in a memory card 110. The control unit 301 reproduces stereoscopic image data from the 3D image file read via the file input unit 302. The correction unit 304 processes the data representing the monocular images constituting a stereoscopic image if the monocular images are not so homogeneous, or have been acquired in the two-take photography mode, thereby correcting the data and switching the monocular images to increase the homogeneity of the monocular images.

The recording unit 305 is similar in configuration to the card interface 109 and the memory card 110, both shown in FIG. 1. Controlled by the control unit 301, the recording unit 305 records the data supplied from the control unit 301 or correction unit 304, as new 3D image file in a prescribed format. The above-mentioned switching of images may be accomplished by rewriting metadata, not by the image processing performed by the correction unit 304. The control unit 301 performs this rewriting of metadata.

The image reproducing unit 303 is constituted by, for example, a direct-view 3D LCD that can display 3D images. The direct-view 3D LCD has a back light slit (or parallax barrier, in a broad sense of the word) that is equivalent in advantage to a parallax barrier. The direct-view 3D LCD is so configured that the user may see different images, at different positions. The control unit 301 divides the left monocular image L and the right monocular image R, each into stripes. The stripes resulting from the monocular image L and the stripes resulting from the monocular image R are alternately arranged and displayed, thereby displaying a 3D image.

The image reproducing unit 303 is not limited to a 3D LCD. It may be, for example, a head-mount display (HMD) that can display two images independently on the left and right screens. Further, the image reproducing unit 303 may be a printer that can print 3D images in the format for 3D print viewers. Still alternatively, the image reproducing unit 303 may be a general-purpose display, such as CRT or LCD, which displays images in a format similar to the 3D print format, so that these images may be observed by using viewers. Moreover, the known time-division display scheme may be employed.

The simplest method of using the homogeneity tag in the image reproducing apparatus 300 will be explained. This method is to generate an alarm or to interrupt the image reproducing process if the homogeneity is low. More precisely, upon receiving an instruction for reproducing data of a file, the apparatus 300 reads data from the file and performs the following controls (not shown in the drawings). In the first step, the value of the homogeneity tag is determined. The process then branches off in accordance with the value determined. If the value determined is "1," the process goes to the second step, in which the 3D image is displayed (the normal display is performed, as described later), and the control is terminated. If the value determined is "2," the image will probably be displayed not so well as desired. Therefore, the process goes to the third step, in which the 3D image is not displayed (that is, the display is interrupted), an alarm is generated, and the control is terminated. The control may be so modified that in the third step, the image is displayed and an alarm is generated, or the image is not displayed, not generating an alarm. The control can inform the user that the image cannot be displayed as desired and can avoid the display of an undesirable 3D image. This prevents the user from being annoyed or fatigued.

The process of switching images at the time of reproducing the 3D image file and the trial display for achieving this process will be explained. The process of switching images, i.e., switching the monocular images L and R to each other, must be performed if the monocular image L and R recorded at each other's position. The trial display is a process of displaying, on the LCD 11, the monocular images L and R in normal way (that is, in the initial arrangement) and the monocular images L and R in each other's position (that is, they are reversed). Therefore, user can confirm whether the correct stereoscopic image in which the monocular images are arranged at appropriate positions, respectively.

It should be added that in a 3D image file recorded in accordance with the basic embodiment, each viewpoint image is allocated to L and R in the two-take photographing on the assumption that the user photographs the object at the left and right viewpoints in accordance with the prescribed photographing order rule. Hence, if the user performs photographing in the wrong order, the images L and R may be recorded at each other's position. This problem is inherent to the two-take photographing and should be solved. The problem can be solved by an effective use of the homogeneity tag, as will be described below.

Figure 7:
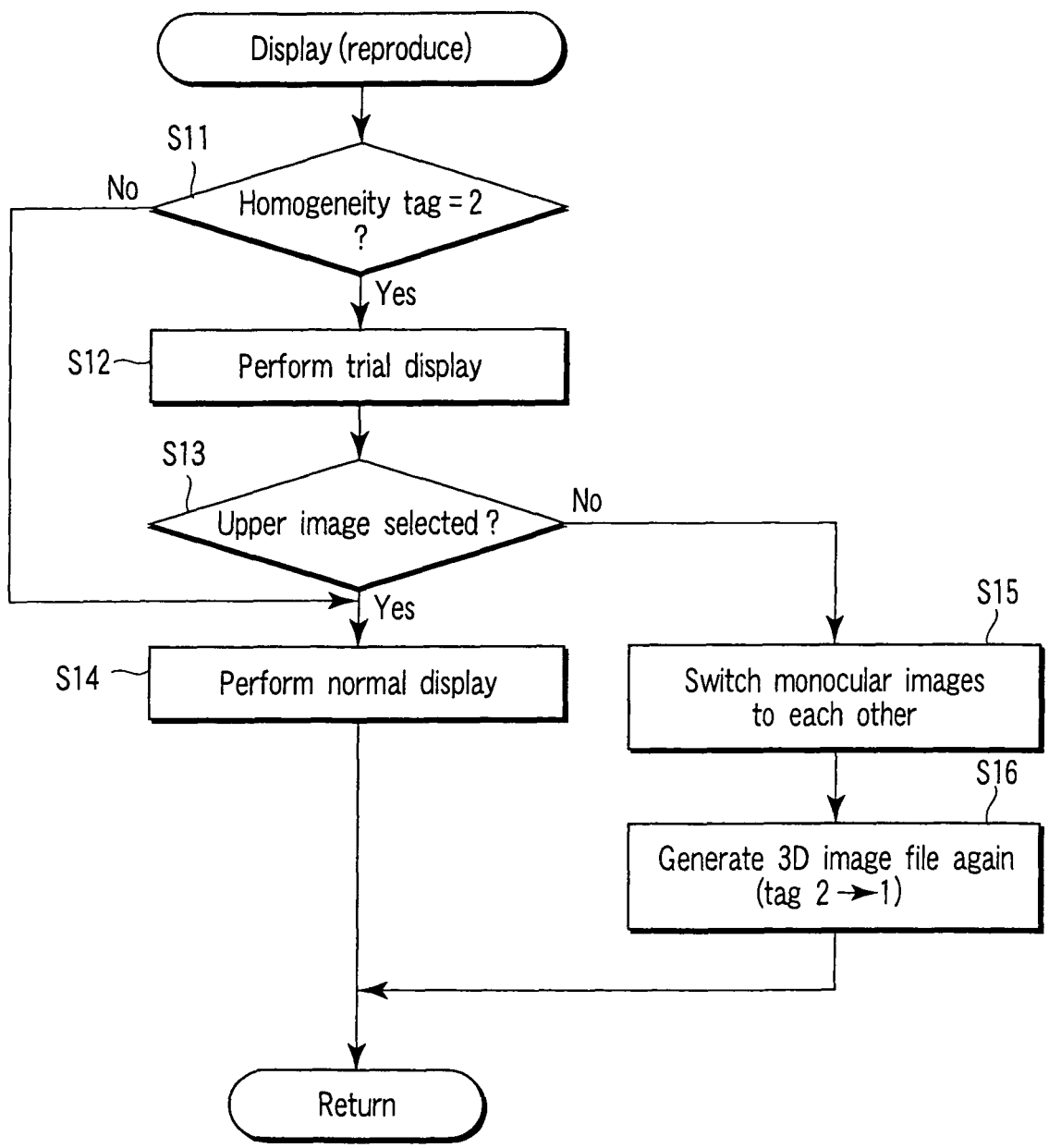
FIG. 7 is a flowchart explaining a display (reproduction) process including trial display.

FIG. 7 is a flowchart explaining the trial display (trial reproduction) of images. The process shown in FIG. 7 is performed by the control unit 301 when the user instructs that 3D images should be reproduced.

First, the homogeneity tag contained in the 3D metadata is read, and it is determined whether the homogeneity tag is set to "2" (Step S11). In Step S11, it may be determined that the homogeneity tag is "1." In this case, the above-mentioned problem does not arise, and a correct stereoscopic image is considered already acquired. Therefore, the process goes to Step S14. In Step S14, normal display is carried out. The process of FIG. 7 is thus terminated.

Figure 8:
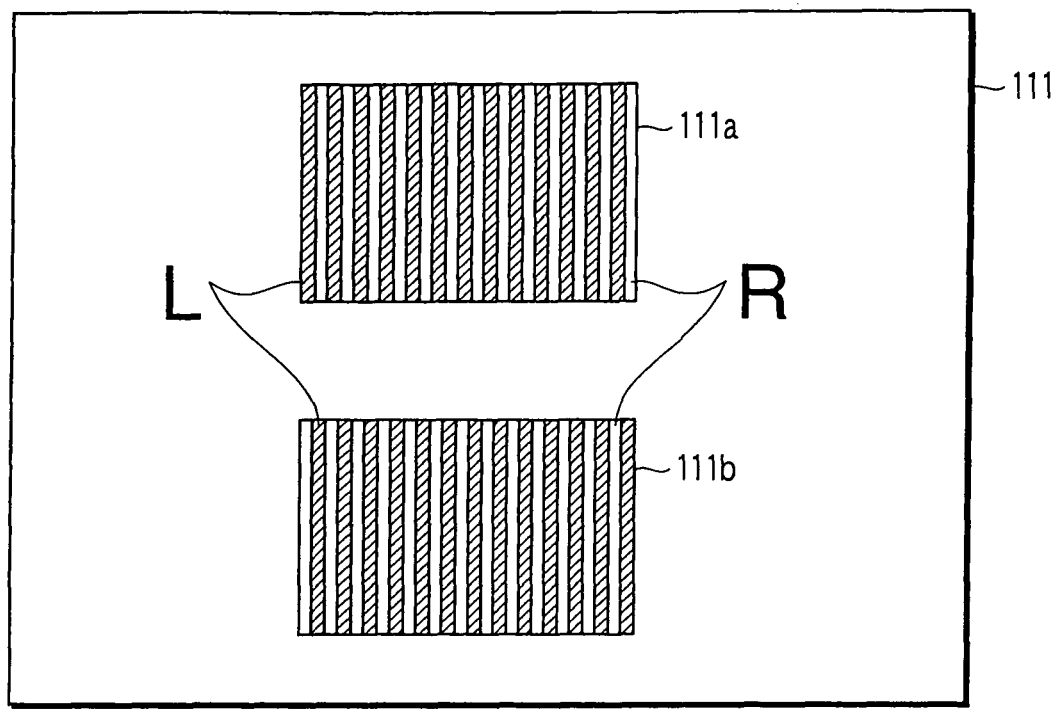
FIG. 8 is a diagram depicting an example of trial display.

In Step S11, the homogeneity tag may be found set to "2." If this is the case, the trial display is performed. That is, as shown in FIG. 8, a normal-display image 111a and a switch-display image 111b are displayed on the LCD 11 at the same time. FIG. 8 schematically shows that on the parallax-barrier, direct-view LCD, the stripe-shaped segments of the monocular images L and R are reversed in the image 111b, with respect to the stripe-shaped segments constituting the normal-display image 111a. In practice, each monocular image is divided into pixels, i.e., far smaller units than the stripe-shaped segments. To display the two images at the same time, the images 111a and 111b are smaller than they are displayed in normal manner or are trimmed in part. The user can compare the images 111a and 111b and select one of them, which is correct.

After the trial display is performed in Step S12, it is determined whether the user has selected the upper image shown in FIG. 8, i.e., the image 111a (Step S13). If the upper image has been selected, Step S13 branches to Step S14. In Step S14, the image 111a is displayed on the LCD 11 (Step S14). Thereafter, the process of FIG. 7 is terminated. In Step S13, it may be determined that the user has selected the lower image. In this case, the monocular images of the 3D image file are switched (Step S15).

Thereafter, the process goes to Step S16, in which the 3D image file is generated again. In this step, the monocular images are switched, not only as displayed ones, but also as the constituent elements of the 3D image file. Two method of switching these images are available. One method is to switch the molecular images L and R, or to rewrite consolidated stereoscopic image data. The other method is to rewrite the 3D metadata, thereby arranging the monocular images L and R at each other's position.

In either method, the erroneous image arrangement resulting from the switching of images can be eliminated. Therefore, the homogeneity tag is rewritten from "2" to "1." The 3D mage file thus reconstructed is recorded in the memory card 110 by the recording unit 305. The 3D image file is thereby regenerated. Thus, the process of FIG. 7 is terminated.

FIG. 10 is a flowchart explaining a process of correcting the images being reproduced in the image reproducing apparatus. This process differs from the image switching process and the trial display for achieving the image switching process, both performed in the 3D image file reproduction explained with reference to FIG. 7. That is, a homogeneity tag prepared in addition to the homogeneity tag for correcting images may be used to switch the images. Alternatively, two values are provided for the homogeneity tag, i.e., "3" indicating that the images have been switched, and "0" indicating that the images have been corrected. In this case, images may be processed if they have not been corrected, though they have been already switched. The process of FIG. 10 is performed by the control unit 301 when the user instructs that the 3D image should be reproduced.

When the user instructs that the 3D image should be reproduced, the control unit 301 checks the homogeneity tag contained in the 3D image file (Step S21). Then, it is determined whether the homogeneity tag is set to "2" (Step S22). In Step S22, it may be determined that the homogeneity tag is "2." If this is the case, the homogeneity of the two monocular images may be low, and the images may not be correctly reproduced. Therefore, Step S22 branches to Step S23. The correction unit 304 corrects the stereoscopic image data (Step S23).

An example of the data correction process will be explained, with reference to FIG. 11. In the data correction process, the correlation between a left monocular image L401 and a right molecular image R402 is detected. The left molecular image L401 is used as reference image, and a prescribed region 401a of the reference image (i.e., region a little smaller than the entire image 401, providing a positional correction margin) is compared with various regions of the right monocular image R402. Of the regions of the right monocular image R402, the region 402b most correlated to the region 401a of the left monocular image L401 is detected and extracted. Using the data representing this region 402b, the positional displacement is corrected. In the case shown in FIG. 11, the image in the region 402b inclines to the image in the region 401a. This inclination is corrected, too. After the positional displacement, including the inclination, has been corrected, the difference in brightness (exposure), if any between the monocular image L401 and the monocular image R402, is corrected, too. The monocular images may differ in resolution (i.e., pixel density). For example, the monocular image L401 may have higher resolution than the monocular image R402. In this case, the relation between the pixels (minute regions) of the monocular image R402 and those of the monocular image L401 is determined from the correlation detected between the molecular images L401 and R402. Then, the pixel data of the monocular image R402 are replaced by the pixel data of the monocular image L401.

After process in Step S23 has been performed, it is determined whether the stereoscopic image data has corrected appropriately (Step S24). The data may not be appropriately corrected (not saved though corrected) in some cases if the above-mentioned positional displacement, for example, is extremely large. In the data is not found to have been appropriately corrected, Step S24 branches to Step S25. In Step S25, an alarm is generated, informing the user that the data has not been appropriately corrected, without displaying (reproducing) the image (Step S25). This alarm is displayed if the image reproducing unit 303 is an LDC. Receiving this alarm, the user knows that the homogeneity of the monocular images is low, and can therefore decide whether to reproduce the 3D image daringly or to stop reproducing the 3D image.

After the alarm has been generated in Step S25, it is determined whether the user has instructed that the image should be reproduced (Step S26). If it is not found in Step S26 that the user has made such an instruction, Step S26 branches to Step S27. In Step S27, it is determined whether an instruction has been made for the next process (Step S27). If such an instruction has not been made in Step S27, the process returns to Step S26, in which a user's instruction is waited for. If such an instruction has been made in Step S27, the process of reproducing the 3D image is interrupted. The process then goes to the next process.

If the homogeneity tag is found in Step S22 to have been set to "1", if the image is found in Step S24 to have been appropriately corrected, or if the image reproduction is found in Step S26 to have been instructed, the process goes to Step S28. In Step S28, the image reproducing unit 303 reproduces the 3D image. If the operation has branched to Step S28 from Step S24, the image data already corrected is generated again and recorded, in the recording unit 305, as a 3D image file containing the homogeneity tag rewritten from "2" to "1" (Step S28). Thereafter, it is determined whether an instruction has been made for the next process (Step S29). If it is determined in Step S29 that an instruction for the next process has not been given, in Step S29, the reproduction of the 3D image is continued. If such an instruction is found in Step S29 to have been made, the reproduction of the 3D image is interrupted, and the next process is performed.

As described above, the information about the homogeneity of two monocular images for the left and right viewpoints is recorded as a homogeneity tag in the present embodiment when a 3D image file is generated. The information about the homogeneity of monocular images can therefore be managed in a simple way.

If it is determined from the homogeneity tag that the apparatus is operating in the two-take photography mode, the stereoscopic image is first corrected and a 3D image is then reproduced in the image reproducing apparatus. This can increase probability that appropriate 3D image is reproduced. If correcting process has not been appropriately performed, an alarm is generated. Therefore, the user can know that the homogeneity of the monocular images is low.

The present invention has been described, with reference to an embodiment. Nevertheless, this invention is not limited to the embodiment. Various changes and modifications can of course be made within the scope and spirit of the present invention.

In the embodiment described above, a homogeneity tag, for example, is recorded, indicating whether two monocular images have been acquired in the one-take photography mode or the two-take photography mode. Instead, the time difference measured by the clock unit 119 may be used as information showing the degree of synchronous photographing of the two monocular images. Further, the reproduction of a 3D image may be interrupted and only one of the monocular images may be displayed as a 2D image, if the image is not found in Step S24 to have been appropriately corrected.

The trial display, the image switching process and the image correcting process may be performed in the digital camera 100.

The embodiment described above has been described, on the assumption that it is desired to perform binocular stereoscopic photographing. Nevertheless, the present invention can be applied to any multi-ocular stereoscopic photographing that provides stereoscopic images, each consisting of three or more monocular images. In this case, a 3D image file is generated and recorded, containing a homogeneity tag set to "1" if n monocular images constituting an n-ocular stereoscopic image are found homogeneous, or set to "2" if n monocular images are not found homogeneous.

The embodiment described above includes various phases of the invention. The components disclosed herein may be combined in various ways to make various inventions. Even if some components of any embodiment described above are not used, it is possible to solve the problems specified above. Any configuration not using some components can be considered as the invention so long as it achieves the advantages described above.

The present invention can provide a 3D image file that can manage the homogeneity of a plurality of monocular images acquired in stereoscopic photographing, a photographing apparatus that can record such a 3D image file, an image reproducing apparatus that reproduce such a 3D image file, and an image processing apparatus that can generate a good 3D image file.

Particularly, in the first and second aspects of the invention, 3D metadata containing the information about the homogeneity of monocular images is added to stereoscopic image data in the process of generating a 3D image file from the monocular images. This makes it easy to manage the homogeneity of the monocular images.

In the third aspect of the invention, an alarm is generated if the homogeneity information about the monocular images contained in the 3D metadata shows low homogeneity. The alarm informs the user that the homogeneity of the monocular images is low, before the image is reproduced. This prevents the user from being annoyed or fatigued.

In the fourth aspect of the invention, the reproduction of the stereoscopic image is interrupted if the homogeneity information about the monocular images contained in the 3D metadata shows low homogeneity. Hence, inappropriate stereoscopic images are never reproduced. This also prevents the user from being annoyed or fatigued.

In the fifth aspect of the invention, the image is corrected to increase the homogeneity of the monocular images if the homogeneity information about the monocular images contained in the 3D metadata shows low homogeneity. An appropriate stereoscopic image is thereby reproduced in the process of reproducing the image.

In the fifth aspect of the invention, too, an alarm unit or an interruption unit is used, informing the user of the state in which a good image cannot be displayed or preventing the displaying of an undesirable 3D image. This also prevents the user from being annoyed or fatigued.

In the sixth aspect of the invention, images are switched if the homogeneity information about the monocular images contained in the 3D metadata shows low homogeneity. An appropriate stereoscopic image is thereby reproduced in the process of reproducing the image even if the images are arranged at wrong positions during the photographing.

In the seventh aspect of this invention, images processed and corrected to increase the homogeneity are recorded as a 3D image file if the homogeneity information about the monocular images contained in the 3D metadata shows low homogeneity. This can provide a 3D image file from which highly homogeneous images can be reproduced.

In the seventh aspect of the invention, too, an alarm unit or an interruption unit is used, informing the user of the state in which a good image cannot be displayed or preventing the displaying of an undesirable 3D image. This also prevents the user from being annoyed or fatigued.

In the eighth aspect of this invention, images switched in position are recorded as a 3D image file if the homogeneity information about the monocular images contained in the 3D metadata shows low homogeneity. This can provide a 3D image file from which highly homogeneous images can be reproduced even if the images are arranged at wrong positions during the photographing.

What is claimed is:

1. A data structure of a 3D image file recorded on a non-transitory recording medium which is readable by a computer to be applied to an image processing apparatus, recording stereoscopic image data composed of a plurality of monocular images that are constituent elements of one multi-ocular stereoscopic image, wherein the 3D image file is constituted as a smallest unit of image treatment by being added 3D metadata including at least information about homogeneity with respect to time or apparatus of the plurality of monocular images to the stereoscopic image data, wherein the information about homogeneity itself is not an image data.

2. The data structure of the 3D image file according to claim 1, wherein the stereoscopic image data is consolidated stereoscopic image data constituted by arranging the plurality of monocular images in different regions of one planar image, and the 3D image file is a 3D image file that is composed of the consolidated stereoscopic image data and the 3D metadata added to the consolidated stereoscopic image data.

3. The data structure of the 3D image file according to claim 1, wherein the stereoscopic image data is multi-page stereoscopic image data having the plurality of monocular images as page images, and the 3D image file is a 3D image file that is composed of the multi-page stereoscopic image data and the 3D metadata added to the multi-page stereoscopic image data.

4. The data structure of the 3D image file according to claim 1, wherein the 3D image file is composed of a plurality of 3D image files, each recording one of the plurality of monocular images, at least one of the plurality of 3D image files contains the 3D metadata, and the 3D metadata contained in the at least one 3D image file contains information representing a relation to the other 3D image files.

5. The data structure of the 3D image file according to claim 1, wherein the information about homogeneity of the plurality of monocular images contains information indicating that the plurality of molecular images have been acquired by exposure at the same time.

6. The data structure of the 3D image file according to claim 5, wherein the information indicating that the plurality of molecular images have been acquired by exposure at the same time contains information about the times at which the plurality of monocular images have been acquired by exposure.

7. The data structure of the 3D image file according to claim 1, wherein the information about homogeneity of the plurality of monocular images contains information showing whether the plurality of monocular images have been acquired by the same photographing apparatus.

8. The data structure of the 3D image file according to claim 1, wherein the information about homogeneity of the plurality of monocular images contains information showing that the plurality of monocular images have been acquired in the same photographing condition.

9. A non-transitory, computer-readable recording medium storing a 3D image file data structure including (a) stereoscopic image data composed of a plurality of monocular images that are constituent elements of one multi-ocular stereoscopic image, and (b) 3D metadata including homogeneity information with respect to time or apparatus of the plurality of monocular images, and which indicates a degree of identity between one image of the plurality of monocular images and another respective image of the plurality of monocular images when each is observed as one image.

10. The data structure of the 3D image file according to claim 1, wherein the information about homogeneity with respect to time or apparatus of the plurality of monocular images to entire or part stereoscopic image data includes information indicating whether or not the plurality of monocular images were acquired at the same time.

11. The data structure of the 3D image file according to claim 1, wherein the information about homogeneity with respect to time or apparatus of the plurality of monocular images to entire or part stereoscopic image data includes information indicating whether or not the plurality of monocular images were acquired by different digital cameras.

12. The non-transitory, computer-readable recording medium according to claim 9, wherein the homogeneity information with respect to time or apparatus of the plurality of monocular images to entire or part stereoscopic image data includes information indicating whether or not the plurality of monocular images were acquired at the same time.

13. The non-transitory, computer-readable recording medium according to claim 9, wherein the homogeneity information with respect to time or apparatus of the plurality of monocular images to entire or part stereoscopic image data includes information indicating whether or not the plurality of monocular images were acquired by different digital cameras.

14. A data structure of a 3D image file-recorded on a non-transitory recording medium which is readable by a computer to be applied to an image processing apparatus, recording stereoscopic image data composed of a plurality of monocular images that are constituent elements of one multi-ocular stereoscopic image, wherein the 3D image file is constituted as a smallest unit of image treatment by being added 3D metadata including at least information about homogeneity with respect to time or apparatus of the plurality of monocular images to the stereoscopic image data, wherein the information about homogeneity is determined based on whether or not the plurality of monocular images were acquired in a two-take photography mode.

15. The non-transitory, computer-readable recording medium of claim 9, wherein the homogeneity information is determined based on whether or not the plurality of monocular images were acquired in a two-take photography mode.

* * * * *